United States Patent
Liao et al.

(10) Patent No.: US 12,501,005 B2
(45) Date of Patent: Dec. 16, 2025

(54) PROJECTION DEVICE AND PROJECTION METHOD

(71) Applicant: Coretronic Corporation, Hsin-Chu (TW)

(72) Inventors: Yi-Jun Liao, Hsin-Chu (TW); Kun-Hong Chen, Hsin-Chu (TW); Yu-Hsuan Hsieh, Hsin-Chu (TW); Yun-Shih Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 18/940,671

(22) Filed: Nov. 7, 2024

(65) Prior Publication Data
US 2025/0159113 A1    May 15, 2025

(30) Foreign Application Priority Data

Nov. 10, 2023  (CN) .......................... 202311497934.6

(51) Int. Cl.
*H04N 9/31* (2006.01)
*G01S 7/48* (2006.01)
(Continued)

(52) U.S. Cl.
CPC ............. *H04N 9/31* (2013.01); *G01S 7/4808* (2013.01); *G01S 7/4814* (2013.01); *G01S 13/04* (2013.01); *G01S 17/08* (2013.01); *G01S 17/89* (2013.01)

(58) Field of Classification Search
CPC ...... H04N 9/3194; H04N 9/3185; H04N 9/31; H04N 9/317; G03B 21/14; G03B 21/2066;
(Continued)

(56) References Cited

U.S. PATENT DOCUMENTS

| 11,622,832 B2* | 4/2023 | Vayser | A61B 90/36 348/207.99 |
| 2006/0197921 A1* | 9/2006 | Kurosu | G03B 21/147 353/70 |

(Continued)

FOREIGN PATENT DOCUMENTS

| CN | 114624850 | 6/2022 |
| CN | 114885138 | 8/2022 |

(Continued)

OTHER PUBLICATIONS

"Office Action of Taiwan Counterpart Application", issued on Jan. 7, 2025, p. 1-p. 5.

(Continued)

*Primary Examiner* — Sherrie Hsia
(74) *Attorney, Agent, or Firm* — JCIPRNET

(57) ABSTRACT

Disclosed are a projection device and a projection method. The projection device includes an optical engine, a distance measuring unit, and a processor. The distance measuring unit is configured to emit testing light to the target area and receive reflected light. The distance measuring unit generates multiple pieces of corresponding distance information according to the reflected lights received and multiple areas of the target area. The processor is configured to: generate area distance information according to the multiple pieces of distance information; select a mode from multiple pieces of sub-area distance information comprised by each piece of area distance information as corrected distance information corresponding to each area; and control the optical engine to project an image beam according to the corrected distance information of each area to form a projected image in the target area.

12 Claims, 7 Drawing Sheets

(51) Int. Cl.
*G01S 7/481* (2006.01)
*G01S 13/04* (2006.01)
*G01S 17/08* (2006.01)
*G01S 17/89* (2020.01)

(58) Field of Classification Search
CPC ..... G03B 21/28; G01S 7/4814; G01S 7/4808; G01S 13/04; G01S 17/08; G01S 17/89
USPC ........ 348/744–747; 382/106; 353/30, 98, 79
See application file for complete search history.

(56) References Cited

U.S. PATENT DOCUMENTS

| | | |
|---|---|---|
| 2017/0363942 A1 | 12/2017 | Hiramatsu et al. |
| 2021/0165308 A1 | 6/2021 | Matsuyama |
| 2021/0377501 A1 | 12/2021 | Tu et al. |
| 2022/0214553 A1 | 7/2022 | Guo et al. |

FOREIGN PATENT DOCUMENTS

| | | |
|---|---|---|
| CN | 115174877 | 10/2022 |
| CN | 115273711 | 11/2022 |
| CN | 115278185 | 11/2022 |
| CN | 115883799 | 3/2023 |
| JP | 5029216 | 9/2012 |
| TW | 202145778 | 12/2021 |

OTHER PUBLICATIONS

Kun-Hing Chen et al., "Projection Device and Projection Method Thereof", Unpublished U.S. Appl. No. 18/940,876, filed Nov. 8, 2024, The specification, claims, and the drawings of the unpublished pending U.S. application have been stored in the Image File Wrapper (IFW) system.

* cited by examiner

PROJECTION DEVICE AND PROJECTION METHOD

CROSS-REFERENCE TO RELATED APPLICATION

This application claims the priority benefit of China application serial no. 202311497934.6, filed on Nov. 10, 2023. The entirety of the above-mentioned patent application is hereby incorporated by reference herein and made a part of this specification.

BACKGROUND

Technical Field

The disclosure relates to a device and a method, and in particular to a projection device and a projection method.

Description of Related Art

When performing projecting, the projection device can perform automatic focusing according to the sensing results of the distance measuring unit. However, when the projection device performs automatic focusing, if there is an obstacle around, interference by the obstacle is often occurred, causing the automatic focusing to be abnormal, so that the projection image is of poor quality or a part of the projection area is covered on the obstacle, thus the viewing experience is affected.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a projection device and a projection method, which can eliminate interference from obstacles during projection.

The projection device of the disclosure is suitable for projecting to a target area, and the projection device includes an optical engine, a distance measuring unit, and a processor. The distance measuring unit is configured to emit a testing light to the target area and receive a reflected light formed by the reflection of the testing light. The distance measuring unit generates a plurality of pieces of corresponding distance information according to the reflected light received and a plurality of predetermined areas of the target area. The processor is coupled to the distance measuring unit and the optical engine, and the processor is configured to: receive the plurality of pieces of distance information from the distance measuring unit and generate a plurality of pieces of area distance information according to the plurality of pieces of distance information; perform determining on the plurality of pieces of area distance information in order to select a mode of a plurality of pieces of sub-area distance information from the plurality of pieces of sub-area distance information comprised in each of the plurality of pieces of area distance information as corrected distance information corresponding to each of the plurality of areas; and control the optical engine to project an image beam to form a projected image in the target area according to the corrected distance information of each of the plurality of areas.

The projection method of the disclosure is suitable for a projection device, and the projection device includes an optical engine, a distance measuring unit, and a processor and is suitable for projecting to a target area, and the projection method includes the following. Testing light is emitted to the target area by the distance measuring unit, and a reflected light formed by the reflection of the testing lights is received, and the distance measuring unit generates a plurality of pieces of corresponding distance information according to the reflected lights received and a plurality of predetermined areas of the target area. The plurality of pieces of distance information from the distance measuring unit are received by the processor and a plurality of pieces of area distance information are generated according to the plurality of pieces of distance information. Determining is performed on the plurality of pieces of area distance information in order to select a mode of a plurality of pieces of sub-area distance information by the processor from the plurality of pieces of sub-area distance information comprised in each of the plurality of pieces of area distance information as corrected distance information corresponding to each of the plurality of areas. The optical engine is controlled by the processor to project an image beam to form a projected image in the target area according to the corrected distance information of each of the plurality of areas.

Based on the above, the projection device and the projection method according to the disclosure can effectively eliminate interference from obstacles during projection, so that the projection operation can correctly focus and adjust the image range.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

DESCRIPTION OF THE EMBODIMENTS

It is to be understood that other embodiment may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
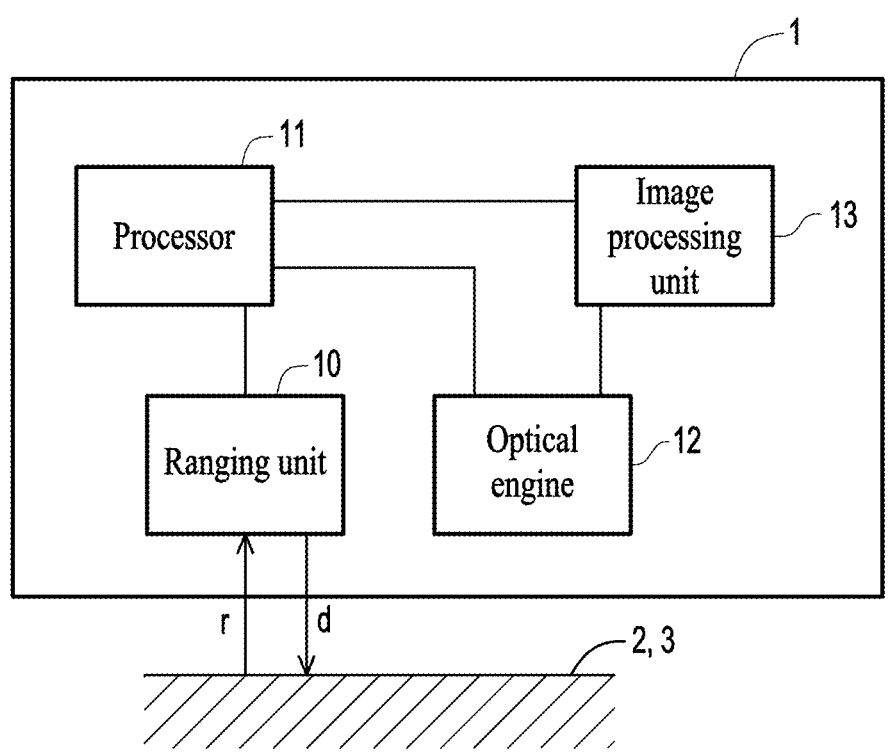
FIG. 1 is a block diagram of a projection device according to an embodiment of the disclosure.

FIG. 1 is a block diagram of a projection device according to an embodiment of the disclosure A projection device 1 includes a distance measuring unit 10, a processor 11, and an optical engine 12. Generally speaking, the projection device 1 may perform ranging to the target area through the distance measuring unit 10, and then the projection device 1 adjusts to an appropriate focal length so that the projected image may be well presented in a target area 2. The target area 2 may be, for example, an area suitable for displaying an image such as the surface of a projection screen, an electronic whiteboard, a wall, or a projection film on a plate, but is not limited thereto. When there is an obstacle around or in front of the target area 2, which affects the distance measurement of the projection device 1, the projection device 1 can eliminate the influence of the obstacle on distance measurement, so that the ranging result can correctly reflect the distance of the target area, which allows the projected image to be ideally focused and imaged according to the distance of the target area, and the projection quality is effectively improved.

Overall, the distance measuring unit 10 may be configured to emit a testing light d to the target area 2 within a region of interest and receive a reflected light r. The testing light d is reflected to form the reflected light r. The distance measuring unit 10 generates multiple pieces of corresponding distance information according to the received reflected light r and multiple predetermined areas defined in the target area 2. Furthermore, the processor 11 coupled to the distance measuring unit 10 and the optical engine 12 may be configured to receive the multiple pieces of distance information provided from the distance measuring unit 10 and generate multiple pieces of area distance information according to the multiple pieces of distance information, wherein each piece of area distance information has multiple of sub-area distance information. Furthermore, the processor 11 performs determining on the multiple pieces of area distance information in order to select a mode from the multiple of sub-area distance information included in each piece of the area distance information and uses the selected mode as corrected distance information corresponding to each area. The processor 11 controls the optical engine 12 to project the image beam according to the corrected distance information of each area to form a projected image in the target area 2, and the projected image in the target area 2 does not cover the obstacle.

In this embodiment, the distance measuring unit 10 may be, for example, a time of flight (ToF) sensor, which includes a SPAD array comprising multiple single photon avalanche diodes (SPAD), and the ToF sensor uses light source for emitting light at specific wavelengths towards objects within the region of interest, and uses the SPAD array having multiple pixels for detecting the light stemming from the objects within the region of interest. The distance measuring unit 10 may perform ranging for a predetermined region in the target area. In other embodiments, the distance measuring unit 10 may be, for example, a 3D camera, which may capture image for a target range and obtain depth information of each object in the captured image. In some embodiments, the processor 11 may be, for example, a central processing unit (CPU), or other programmable general-purpose or special-purpose micro control units (MCU), a microprocessor, a digital signal processor (DSP), a programmable controller, an application specific integrated circuit (ASIC), a graphics processing unit (GPU), an arithmetic logic unit (ALU), a complex programmable logic device (CPLD), a field programmable gate array (FPGA), any other kinds of integrated circuits, a state machine, a processor based on advanced RISC machine (ARM), or other similar components or a combination of the above components. In some embodiments, the optical engine 12 may have, for example, a light source, a lens element, a reflective member, at least one light valve (for example, a digital micromirror device, DMD or a liquid crystal on silicon panel, LCoS panel), and other lens structures such as including one or more optical lens elements with diopter.

Figure 2A:
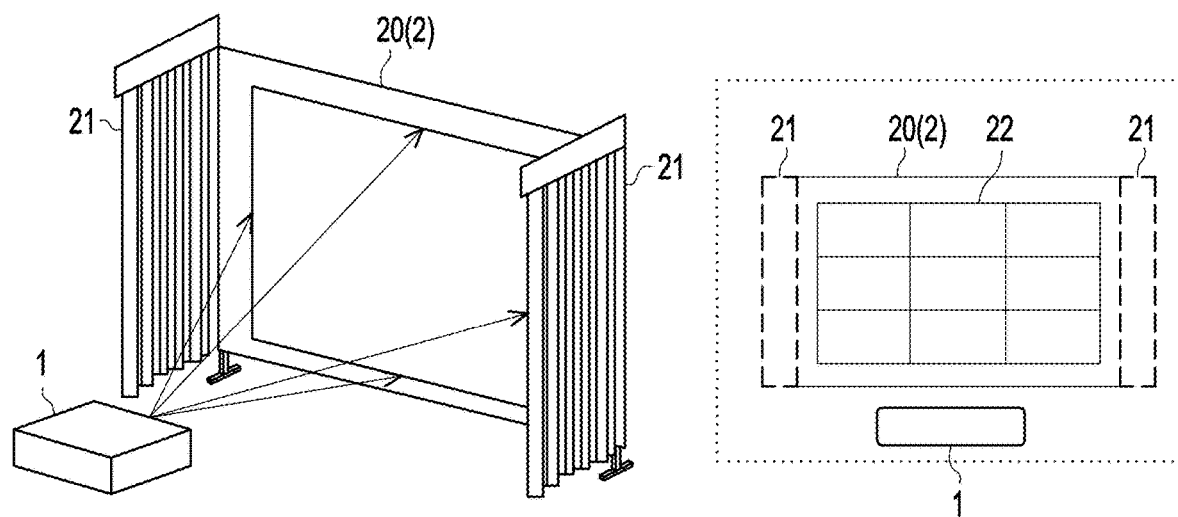
FIG. 2A and FIG. 2B are schematic diagrams of the projection device projecting to a target area according to embodiments of the disclosure.
Figure 2B:
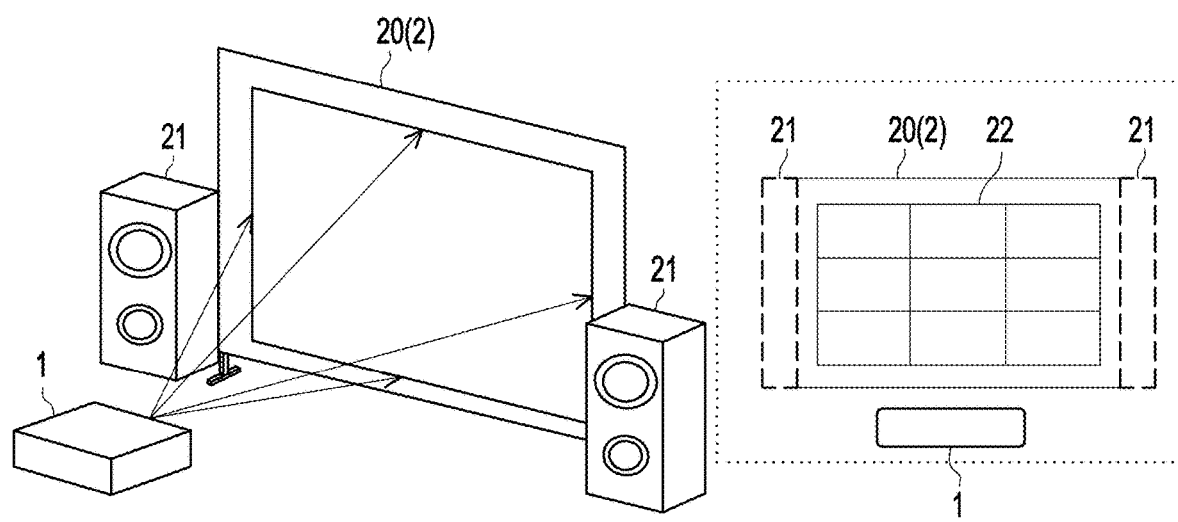

FIG. 2A and FIG. 2B are schematic diagrams of the projection device projecting to a target area according to embodiments of the disclosure. In FIG. 2A and FIG. 2B, a scene in which the projection device 1 projects onto the target area 2 is shown. The target area 2 is disposed with, for example, a projection surface 20, and, obstacles 21 on both sides of the projection surface 20. The projection device 1 is configured to project image light to the target area 2. In order for the projection device 1 to adjust the projected image to the projection surface 20 of the target area 2, the projection device 1 first performs ranging on the target area 2 to obtain distance information corresponding to the projection surface 20 and then adjusts the focal length of the optical engine 12 (lens assembly) accordingly. The obstacles in FIG. 2A and FIG. 2B may be, for example, curtains and/or speakers.

Please continue to refer to FIG. 2A and FIG. 2B together with FIG. 1. Specifically, the distance measuring unit 10 may be configured to emit the testing light d to the target area 2 and receive the reflected light r formed by the reflection of the testing light. The testing light d is emitted to the projection surface 20 to forms a predetermined region 22, and the testing light d is reflected as the reflected light r and transmitted back to the distance measuring unit 10, so as to generate multiple pieces of corresponding distance information for the predetermined region 22 according to the reflected light r. The predetermined region 22 represents, for example, a predetermined projection region defined internally by the projection device 1.

Figure 2C:
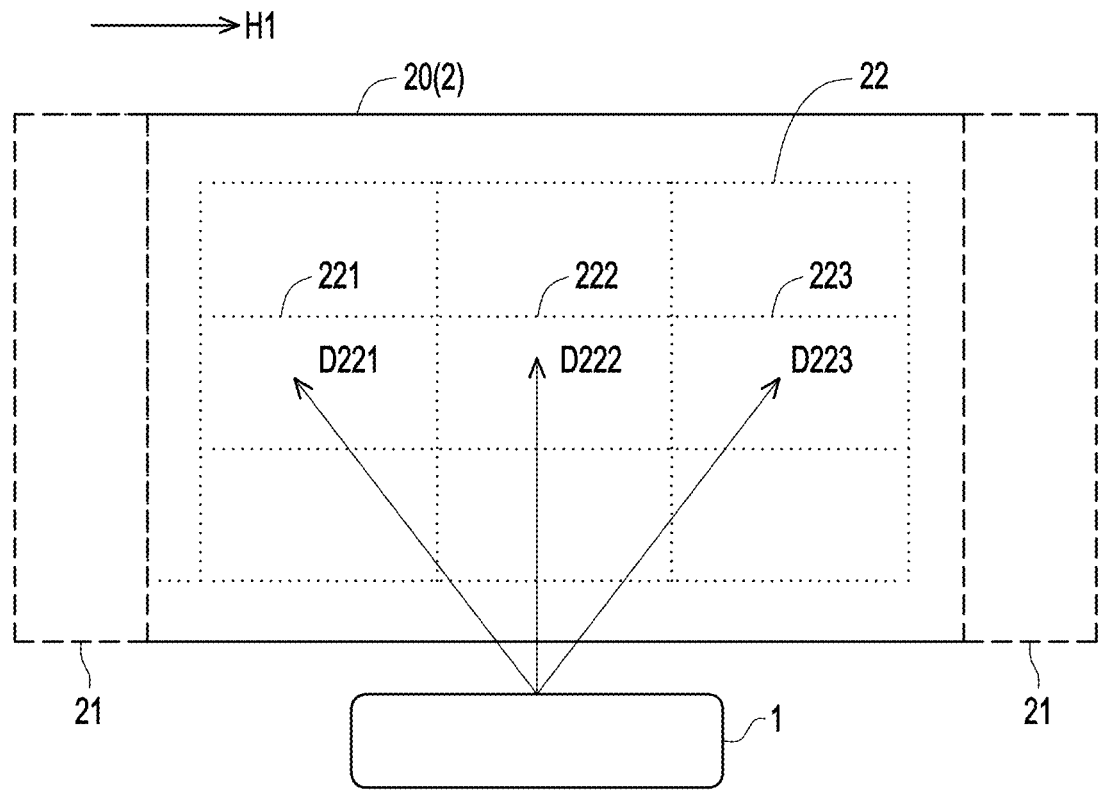
FIG. 2C is a schematic diagram of the projection device performing ranging to the target area according to an embodiment of the disclosure.

FIG. 2C is a schematic diagram of the projection device performing ranging to the target area according to an embodiment of the disclosure. Referring with FIG. 1, FIG. 2A, and FIG. 2B, the processor 11 of the projection device 1 may perform ranging on areas 221 to 223 arranged in a first direction H1 (for example, a horizontal direction) in the predetermined region 22 through the distance measuring unit 10 to obtain corresponding distance information D221 to D223, and the optical engine 12 is set accordingly. In this way, the projection device 1 can control the optical engine 12 to project the image beam according to the ranging result to form a clear projected image in the target area 2.

Please continue to refer to FIG. 1, FIG. 2A, FIG. 2B, and FIG. 2C. Ideally, during the distance measurement, the predetermined region of the distance measuring unit 10 of the projection device 1 may fall within the projection surface 20. In this way, the distance measurement (ranging) can be performed correctly for the projection surface 20. However, in some cases, when a part of the predetermined region of the distance measuring unit 10 overlaps with the obstacle 21, ranging result may be inaccurate, thereby affecting the setting of the focal length for projection or the correction of the projected image.

Figure 3A:
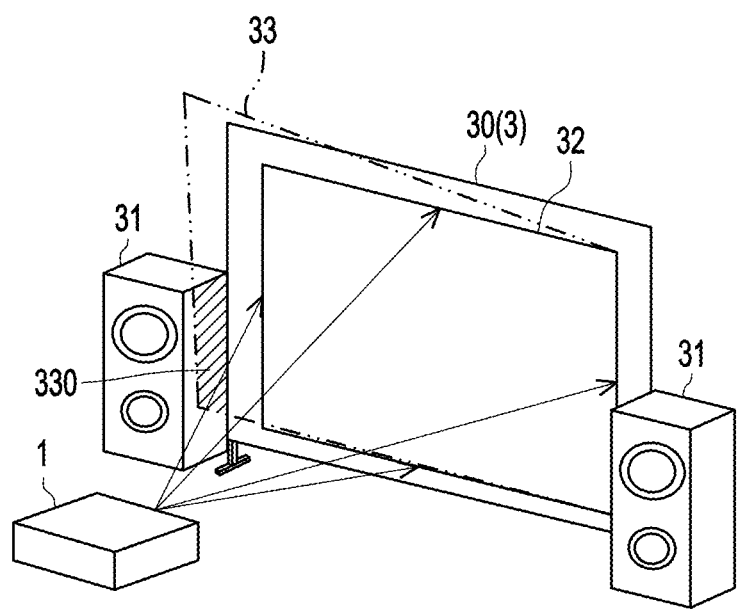
FIG. 3A is a schematic diagram of the projection device projecting to the target area according to an embodiment of the disclosure.

FIG. 3A is a schematic diagram of the projection device projecting to the target area according to an embodiment of the disclosure. Please refer to FIG. 1 together with FIG. 3A. The projection device 1 is configured to project to a target area 3. The target area 3 has a projection surface 30, and speakers (obstacles 31) are disposed on both sides of the projection surface 30. Ideally, when the projection device 1 projects to the projection surface 30, the image is formed in a predetermined region 32 on the projection surface 30. However, in this embodiment, the projection region of the projection device 1 may shift due to the disposed angle of the projection device 1. For example, an initial projection region 33 has a partial overlapped area 330 (slash area) with the obstacle 31. As a result, the projection device 1 performs ranging according to the initial projection region 33, which causes the projection device 1 to determine the wrong focal length and wrong imaging position. In order to avoid the above situation, the projection device 1 can perform calculation and correction to determine distance information corresponding to the projection surface 30.

Figure 3B:
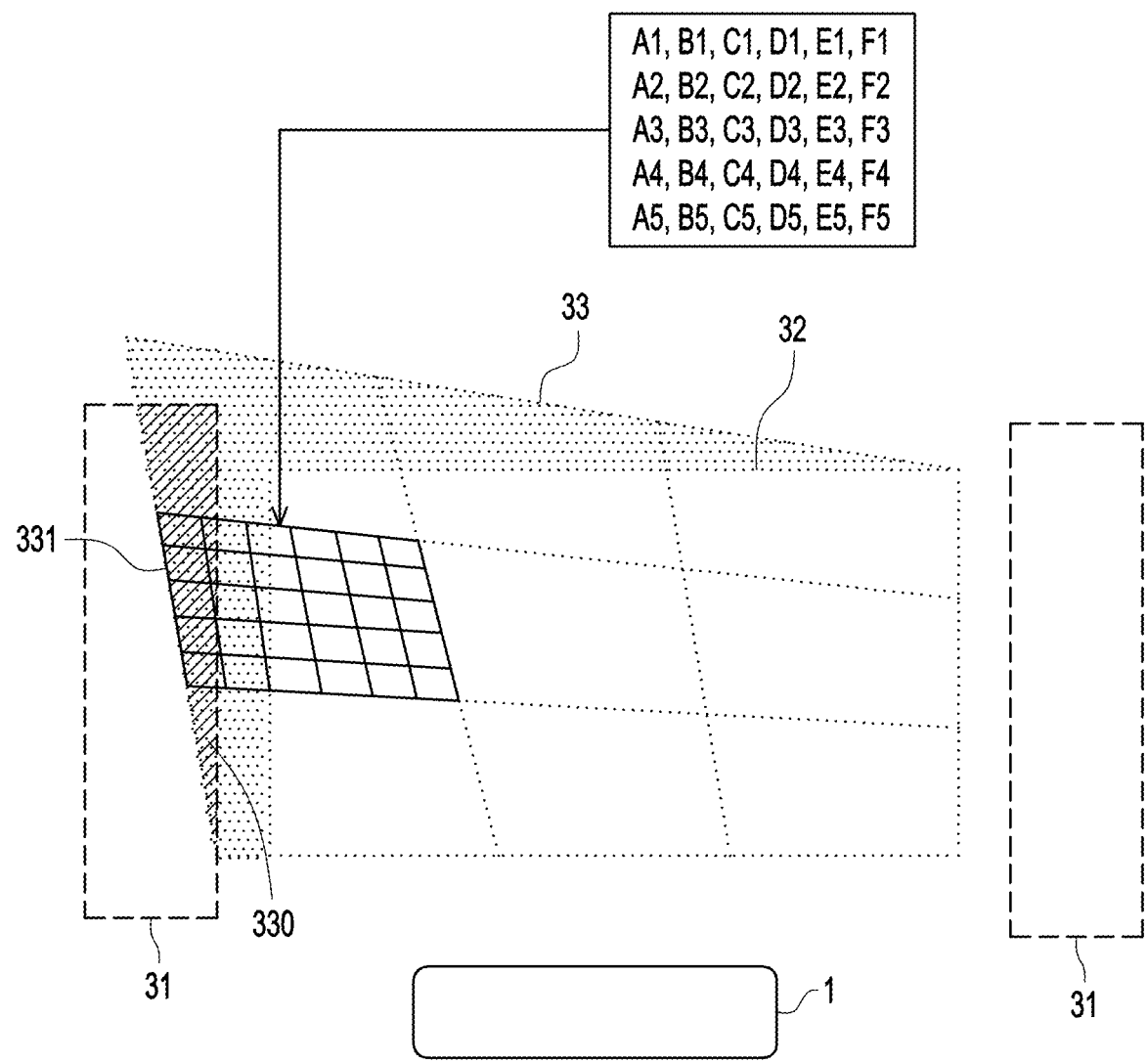
FIG. 3B is a schematic diagram of a distance measuring unit performing ranging to the target area according to an embodiment of the disclosure.

FIG. 3B is a schematic diagram of a distance measuring unit performing ranging to the target area according to an embodiment of the disclosure. Please refer to FIG. 1 together with FIG. 3A. The SPAD array of the distance measuring unit 10 of the projection device 1 in this embodiment may be configured to perform ranging to the predetermined region in the target area 3. This region may be, for example, close to the predetermined projection region of the optical engine 12. The SPAD array of the distance measuring unit may be divided into multiple blocks, and the blocks may respectively correspond to predetermined points, predetermined positions, or predetermined sub-areas on the predetermined region. Each block receives a sub-beam of the reflected light r reflected from the corresponding position of the predetermined region. The distance measuring unit 10 calculates the distance by determining the flight time from emitting the testing light d to receiving the reflected light r and then generates corresponding distance information. Therefore, the distance information include each distance from the distance measuring unit 10 to the corresponding position of the predetermined region. In the disclosure, the distance measuring unit 10 emits the testing light d to the target area 2, and light spot of the testing light d formed on the target area 2 is larger than or equal to the predetermined region on the target area 2. And multiple sub-beams of the reflected light r formed by the reflection of the testing light may be respectively received by multiple blocks of the SPAD array of the distance measuring unit 10.

Taking area 331 in the initial projection region 33 as an example, the area 331 may be further divided into multiple sub-areas A1 to A5, B1 to B5, C1 to C5, D1 to D5, E1 to E5, and F1 to F5. The sub-areas A1 to A5 correspond to, for example, the leftmost first column in the area 331. From top to bottom, they are A1, A2, A3, A4, and A5, in which the sub-areas A1 to A5 all overlap with the obstacle 31. The sub-areas B1 to B5 correspond to, for example, the second column from the left in the area 331. From top to bottom, they are B1, B2, B3, B4, and B5, in which the sub-areas B1 to B3 partially overlap with the obstacle 31, while the sub-areas B4 and B5 do not overlap with the obstacle 31. The sub-areas C1 to C5 correspond to, for example, the third column from the left in the area 331. From top to bottom, they are C1, C2, C3, C4, and C5, in which sub-areas C1 to C5 do not overlap with the obstacle 31. For the sub-areas D1 to D5, E1 to E5, and F1 to F5, reference may be made by analogies to the above description, so will not be repeated here. The sub-areas D1 to D5, E1 to E5, and F1 to F5 do not overlap with the obstacle 31. The blocks in the SPAD array corresponding to the corresponding sub-areas can receive the reflected light reflected by the corresponding sub-areas, so that the distance measuring unit 10 generates the corresponding distance information. In this embodiment, the initial projection region 33 of the projection device 1 may be defined in advance by the processor 10 so as to divide and define, for example, nine areas in the initial projection region 33, and further define, for example, thirty sub-areas in each area of initial projection region 33. Correspondingly, in order to perform ranging, the entire SPAD array in the distance measuring unit 10 may also be defined in advance into nine blocks, corresponding to the nine areas of the initial projection range 33 respectively and configured to receive reflected lights from the nine areas correspondingly. Each block may include a part of the SPAD array. Also, each block in the nine blocks is defined as the multiple SPAD blocks, and each SPAD block may receive the reflected light reflected by each corresponding sub-area. In this way, the distance measuring unit 10 can calculate the distance information according to the reflected light received by each SPAD block. In this way, when the distance measuring unit 10 provides the distance information to the processor 11, the distance information may be provided together with the corresponding area information to the processor 11 in order to facilitate subsequent operations of the processor 11. Regarding how to provide the distance information together with the corresponding area information to the processor 11, changes and adjustments may be made according to different system requirements. For example, the distance measuring unit 10 may transmit the distance information corresponding to the same area to the processor within a time period. Alternatively, the distance measuring unit 10 may add the area information to each piece of the distance information additionally. Also, it may be that each SPAD block in the distance measuring unit 10 has a given number, and the distance measuring unit 10 may provide the distance information and the given number of the sensed SPAD block to the processor 11, so that the processor 11 may look up the table according to the given number to know the SPAD block corresponding to the distance information. However, it should be understood that various changes should fall within the scope of modified embodiments of the disclosure, rather than to limit the disclosure.

Figure 3C:
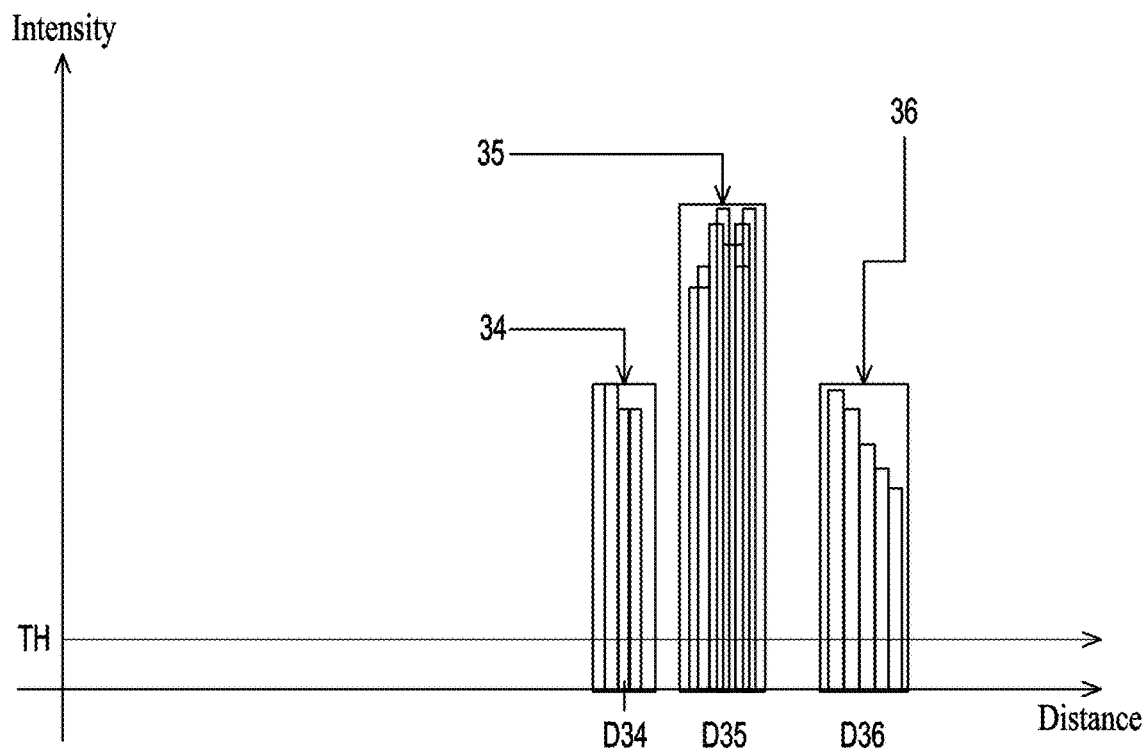
FIG. 3C is a schematic diagram of an energy intensity versus a corresponding distance of reflected light received by the distance measuring unit in FIG. 3B.

FIG. 3C is a schematic diagram of an energy intensity versus a corresponding distance of reflected light received by the distance measuring unit in FIG. 3B. Please refer to FIG. 3C together with FIG. 3B and FIG. 1. The horizontal axis refers to, for example, the distance corresponding to the reflected light due to the different sub-areas in the area 331 of the target area in FIG. 3B, while the vertical axis refers to the energy intensity of the reflected light received by the distance measuring unit 10 at different distances. In some embodiments, the distance measuring unit 10 may select multiple pieces of distance information according to whether the energy intensity of the reflected light received is greater than a predetermined threshold value TH. In other words, the distance measuring unit 10 may compare the energy intensity of the reflected light received with the predetermined threshold value TH and determine the corresponding distance information for the reflected light whose energy intensity is greater than or equal to the predetermined threshold value TH while ignoring the reflected light whose energy intensity is smaller than the predetermined threshold value TH.

Please continue to refer to FIG. 1. After receiving the distance information from the distance measuring unit 10, the processor 11 of the projection device 1 may generate area distance information according to the distance information. Specifically, since each of the multiple pieces of distance information received by the processor 11 is associated with the corresponding area in the initial projection region 33, the processor 11 may group all the distance information accordingly, and then group the distance information corresponding to the same area into the same area distance information. Therefore, each piece of the area distance information may contain multiple pieces of sub-area distance information, and each pieces of the sub-area distance information corresponds to each sub-area in the area.

For example, FIG. 3C shows the area distance information corresponding to the area 331 grouped by the processor 11, and the histograms in FIG. 3C may represent the sub-area distance information in the area 331. Furthermore, the processor 11 may further group the sub-area distance information into different distance ranges according to a predetermined precision condition, and the predetermined precision condition may be, for example, 0.5, 1, 5, 10 centimeters or other suitable distances. For example, if the difference among a part of the multiple pieces of sub-area distance information is in the range of 1 centimeters, the part of the multiple pieces of sub-area distance information would be in the same group. The processor 11 may group the sub-area distance information in the same distance range into the same sub-area distance information group. Therefore, the sub-area distance information corresponding to the sub-areas A1 to A5, B1 to B5, C1 to C5, D1 to D5, E1 to E5, and F1 to F5 indicated in FIG. 3B may be grouped into sub-area distance information group 34 to 36. In this embodiment, the sub-area distance information group 34 corresponds to a distance range and includes the sub-area distance information corresponding to the sub-areas B1 to B3. The sub-area distance information group 35 corresponds to another distance range and includes the sub-area distance information corresponding to the sub-areas B4 to B5, C1 to C5, D1 to D5, E1 to E5, and F1 to F5. The sub-area distance information group 36 corresponds to still another distance range and includes the sub-area distance information corresponding to the sub-areas A1 to A5.

Please continue to refer to FIG. 1. In some embodiments, for each area, the processor 11 may select the mode of the sub-area distance information from the multiple pieces of sub-area distance information included in the corresponding area distance information as corrected distance information corresponding to the area. For example, taking FIG. 3C together with FIG. 1 as an example, the processor 11 of the projection device 1 may select the distance corresponding to the sub-area distance information group from a group with a largest quantity among the sub-area distance information groups 34 to 36 to generate the corrected distance information. Therefore, in this embodiment, the quantities of the sub-area distance information group 34 and the sub-area distance information group 36 are relatively less than the quantity of the sub-area distance information group 35, and the processor 11 may select the sub-area distance information group 35 with the largest quantity and take a corresponding distance D35 thereof to generate the corrected distance information.

Through the processor 11 selecting the group with the largest quantity of the sub-area distance information as the corrected distance information for the area, the interference of the obstacle on the projection operation can be effectively eliminated. For example, as shown in FIG. 3B, in the area 331 of the initial projection range 33, the sub-areas A1 to A5 corresponds to, for example, the range of the obstacle 31, and the sub-areas B1 to B3 partially corresponds to, for example, partially the range of the obstacle 31. Therefore, the sub-areas A1 to A5 and B1 to B3 do not belong to the continuous plane range of the projection plane 30 and are not suitable for projection. In this case, the processor 11 filters out the sub-area distance information by the mode, and the depth or distance corresponding to the obstacle can be effectively eliminated.

However, in actual applications, the projection device 1 cannot determine in which area the obstacle appears. Therefore, the processor 11 performs calculations one by one for all areas to generate the corresponding corrected distance information. Therefore, in this embodiment, the processor 11 may generate nine pieces of corrected distance information corresponding to the nine areas of the initial projection region 33 respectively.

Please continue to refer to FIG. 1, FIG. 3A, and FIG. 3B. After the processor 11 obtains the corrected distance information of the nine areas, the distance of all areas of the projection surface 30 can be determined accordingly. In this way, the image beam emitted by the optical engine 12 that is set according to the corrected distance information is not projected onto the obstacle 31 and can be correctly displayed on the projection surface 30.

In addition to distance, the processor 11 can also eliminate the interference of the obstacle on angle according to the corrected distance information. In some embodiments, the projection device 1 also includes an image processing unit 13 coupled to the processor 11. The processor 11 may select selected area distance information of different directions according to the corrected distance information and provide to the image processing unit 13 to perform a keystone correction, so that the shape of the projected image can be corrected to be close to a rectangle, thereby avoiding distortion when the user watches. In some embodiments, the image processing unit may be, for example, a scalar.

Figure 3D:
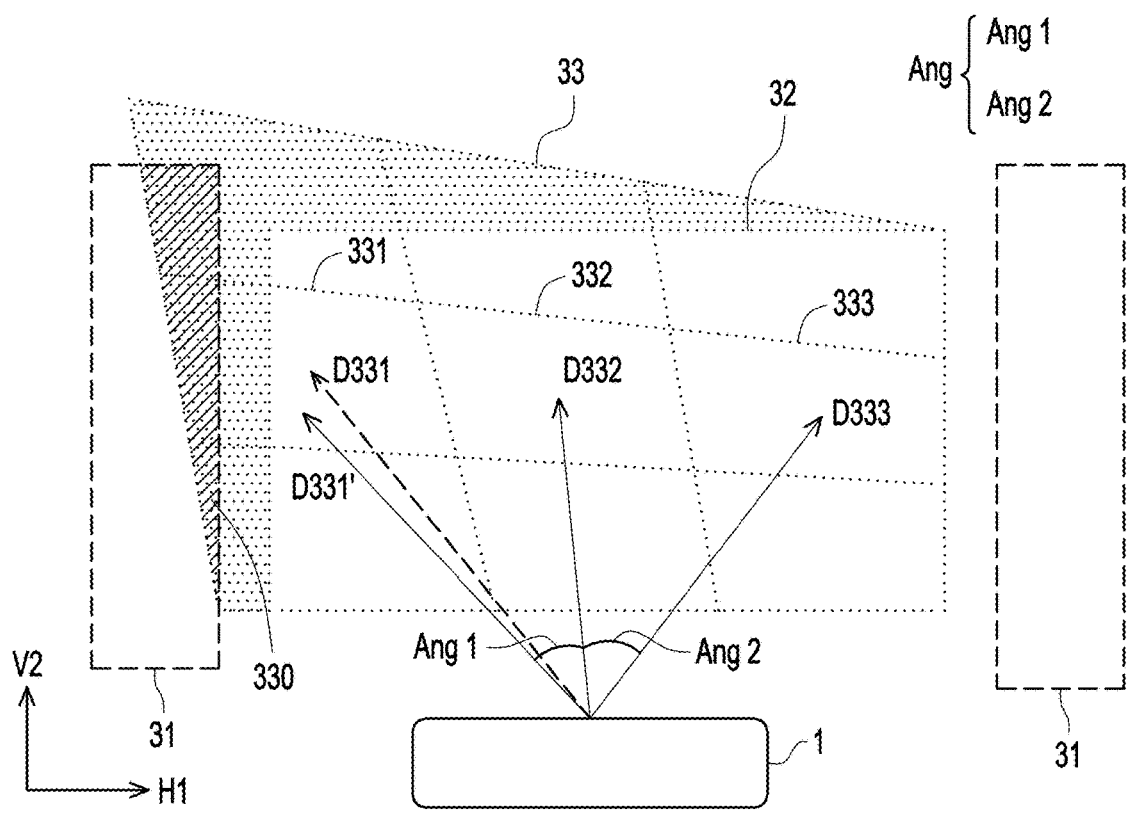
FIG. 3D is a schematic diagram of at least three pieces of first selected area distance information selected.

FIG. 3D is a schematic diagram of at least three pieces of first selected area distance information selected. Please continue to refer to FIG. 1 together with FIG. 3D. Specifically, the processor 11 of the projection device 1 selects at least three pieces of first selected area distance information D331', D332, D333 arranged along the first direction H1 and at least three pieces of second selected area distance information arranged along a second direction V2 to obtain the angle information required for the keystone correction, in which the angle information corresponding to the first selected area distance information D331', D332, and D333 is, for example, a first angle Ang on FIG. 3D. In detail, the first selected distance information D331', D332, and D333 respectively correspond to the left, middle, and right areas (e.g., area 331, 332, 333) arranged along the first direction H1 in the initial projection region 33, and the distance information D332 corresponds to the midpoint of the projection region. The first angle Ang includes an angle Ang 1 corresponding to the projection device 1 and the areas 331 and 332 and an angle Ang 2 corresponding to the projection device 1 and the areas 332 and 333, in which the angle Ang 1 and the angle Ang 2 are equal (the light exiting angle of ToF is a known quantity). By the first angle Ang and the first selected distance information D331', D332, D333, the first relative angle between the projection device 1 and the projection surface 30 can be calculated. There will be a second angle (not shown) in the second direction V2 perpendicular to the first direction H1, and the second relative angle between the projection device 1 and the projection surface 30 is also calculated according to the second angle and the second selected distance information with a similar concept as the first angle Ang, so will not be repeated here. In other words, the angle information includes the first relative angle and the second relative angle. Next, the processor 11 transmits the angle information and the distance information to the image processing unit 13, and the image processing unit 13 uses the keystone correction algorithm to calculate coordinates at the four corner points of the corrected projection region according to the angle information, the distance information, and the sensing result of the acceleration sensor (not shown) in the projection device 1 and moves the coordinates at the four corner points of the original projection region to the coordinates at the four corner points of the corrected projection region, thereby the projected image is modified into a predetermined rectangle. However, the disclosure is not limited thereto. The predetermined shape of the projected image may be determined according to actual applications.

Please continue to refer to FIG. 1 together with FIG. 3D. The processor 11 of the projection device 1 has selected the areas 331 to 333 in the middle row of the initial projection region 33 and the corresponding distance information D331', D332, and D333 thereof as the selected area distance information. If the processor 11 uses distance information D331 in the area to represent the distance information of the area, then the image processing unit 13 performs calculations according to the distance information D331 that takes the obstacle 31 into consideration. In this way, when performing focusing and keystone correction, calculations are performed according to the erroneous distance information D331. Therefore, erroneous and distorted focal length settings and image range settings are generated, resulting in poor imaging quality and failure to avoid the obstacle 31. In comparison, the disclosure uses the distance information D331' generated by the mode, and the distance of the area on the projection surface 30 not covering the obstacle can be correctly reflected. The image processing unit 13 can correctly adjust the focal length according to the distance information D331', D332, and D333 and determine the included angle of connected lines between the areas 331 to 333 according to the corrected distance information to appropriately perform the keystone correction to adjust the projected image region, so that the image formed by the projection device 1 on the projection plane 30 does not cover the obstacle 31, and the projection quality is effectively improved.

Figure 4A:
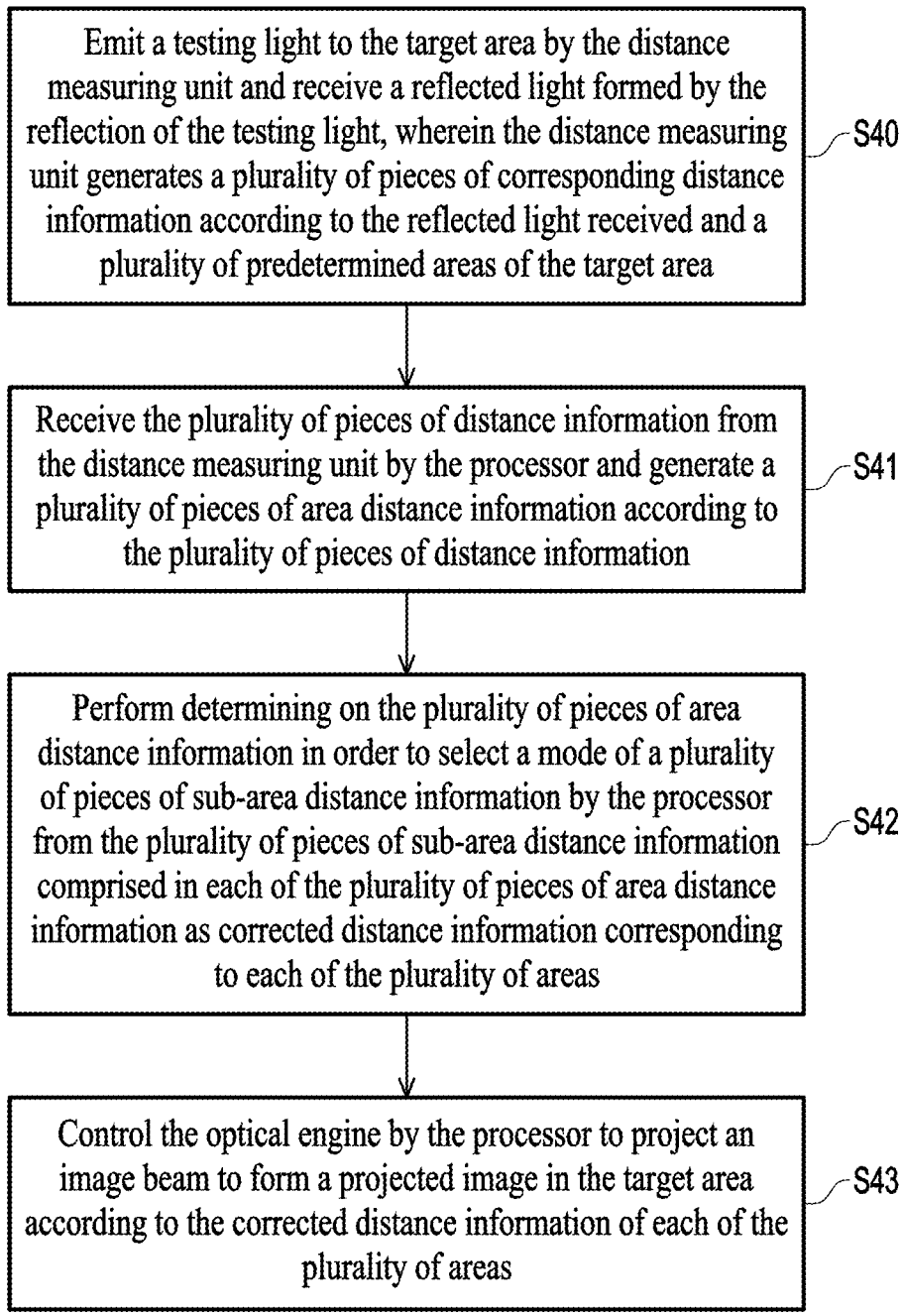
FIG. 4A is a flow chart of a projection method according to an embodiment of the disclosure.

FIG. 4A is a flow chart of a projection method according to an embodiment of the disclosure. The projection method in FIG. 4A may be applied to the projection device 1 in FIG. 1. The projection method includes Steps S40 to S43. In Step S40, the distance measuring unit may emit a testing light to the target area and receive a reflected light formed by the reflection of the testing light. The distance measuring unit generates multiple pieces of distance information corresponding to multiple areas according to the reflected light received and multiple predetermined areas of the target area. In Step S41, the processor may receive distance information from the distance measuring unit and generate multiple pieces of area distance information according to the distance information. In Step S42, the processor perform determining on each piece of area distance information and select the mode of sub-area distance information from multiple pieces of sub-area distance information included in each piece of area distance information as the corrected distance information of the corresponding area. In Step S43, the processor may control the optical engine to project the image beam according to the corrected distance information of each area to form a projected image in the target area, in which the projected image in the target area does not cover the obstacle.

Figure 4B:
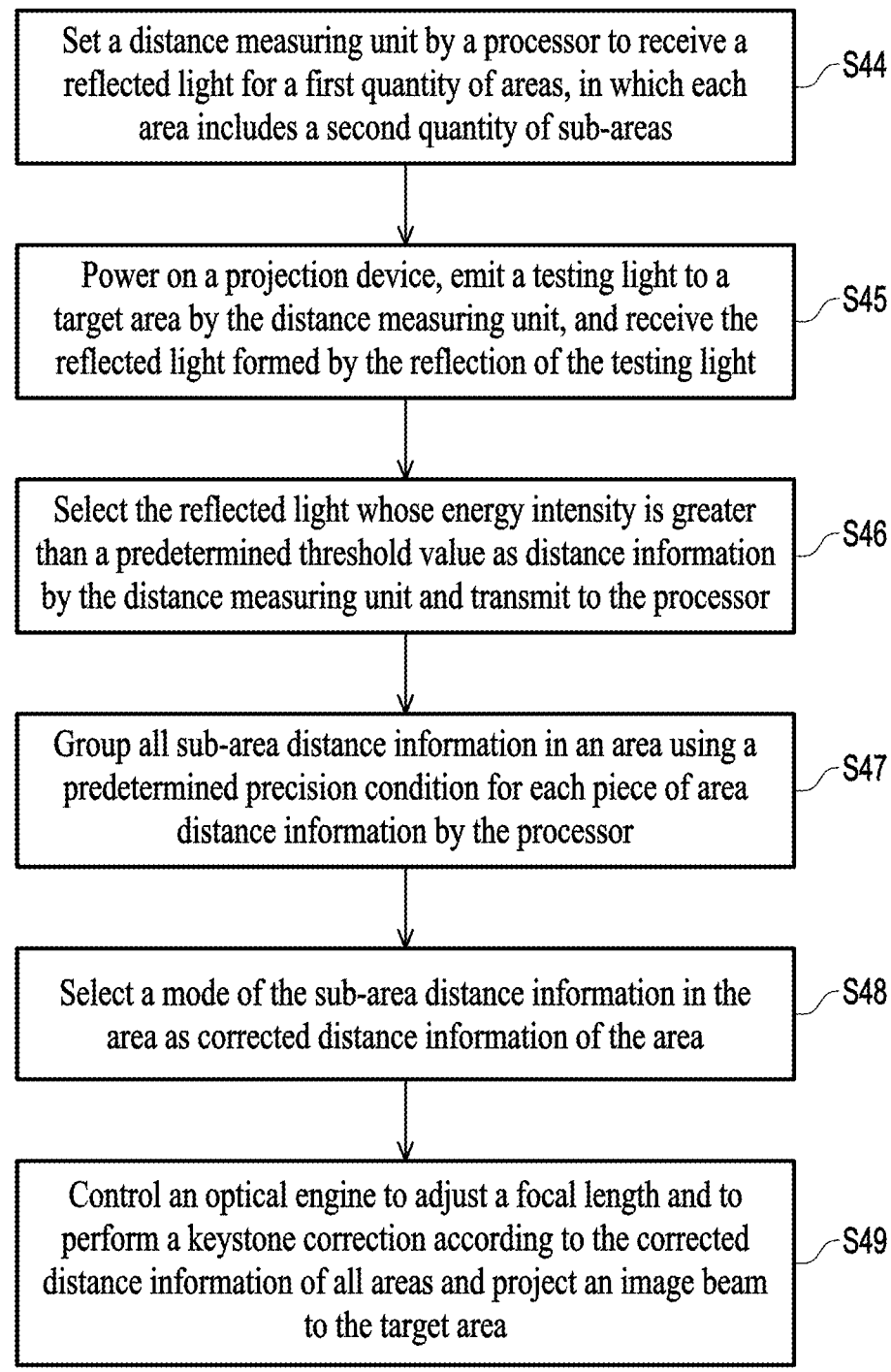
FIG. 4B is a flow chart of a projection method according to an embodiment of the disclosure.

FIG. 4B is a flow chart of a projection method according to an embodiment of the disclosure. The projection method in FIG. 4B may be applied to the projection device 1 in FIG. 1. The projection method includes Steps S44 to S49. In Step S44, the processor sets the distance measuring unit to receive reflected lights for a first quantity of areas, in which each area includes a second quantity of sub-areas. In the above example, the first quantity may be, for example, nine, and the second quantity may be, for example, thirty. In Step S45, after the projection device is powered on, the distance measuring unit may emit the testing light to the target area and receive the reflected light formed by the reflection of the testing light. In Step S46, the distance measuring unit may select the reflected light whose energy intensity is greater than the predetermined threshold value as the distance information and associate the distance information with the corresponding area to transmit to the processor. In Step S47, the processor may group the distance information according to the associated area to generate multiple pieces of area distance information respectively corresponding to multiple areas in the projection region. Also, each piece of area distance information further includes a second quantity of pieces of sub-area distance information respectively corresponding to each sub-area in the area. In addition, for each area distance information, the processor may further group all sub-area distance information in the area with the predetermined precision condition and divide into multiple sub-area distance information groups in a manner such as shown in FIG. 3C. In Step S48, the processor may select the mode of the sub-area distance information in the area as the corrected distance information of the area. In other words, the processor may select the distance corresponding to the sub-area distance information group with the largest quantity as the corrected distance information for the area. In Step S49, the processor controls the optical engine to adjust the focal length and to perform the keystone correction according to the corrected distance information of all areas and projects the image beam to the target area.

In summary, the projection device and the projection method according to the disclosure can effectively eliminate interference from obstacles during projection, so that the projection operation can correctly focus and adjust the image range.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. A projection device suitable for projecting to a target area, wherein the projection device comprises an optical engine, a distance measuring unit, and a processor, wherein
    the distance measuring unit is configured to emit testing light to the target area and receive reflected light formed by the reflection of the testing light, and the distance measuring unit generates a plurality of pieces of corresponding distance information according to the reflected light received and a plurality of areas of the target area; and
    the processor is coupled to the distance measuring unit and the optical engine, and the processor is configured to:
        receive the plurality of pieces of distance information from the distance measuring unit and generate a plurality of pieces of area distance information according to the plurality of pieces of distance information;
        perform determining on the plurality of pieces of area distance information in order to select a mode of a plurality of pieces of sub-area distance information from the plurality of pieces of sub-area distance information comprised in each of the plurality of pieces of area distance information as corrected distance information corresponding to each of the plurality of areas; and
        control the optical engine to project an image beam to form a projected image in the target area according to the corrected distance information of each of the plurality of areas.

2. The projection device as claimed in claim 1, wherein the processor is configured to:
    set the distance measuring unit to define the target area to have the plurality of areas and divide each of the plurality of areas of the target area into a plurality of sub-areas; and
    group the plurality of pieces of distance information from the distance measuring unit into the plurality of pieces of area distance information, and each of the plurality of area distance information comprises the plurality of pieces of sub-area distance information.

3. The projection device as claimed in claim 2, wherein the distance measuring unit selects the plurality of pieces of distance information according to whether an energy intensity of the reflected light is greater than a predetermined threshold value.

4. The projection device as claimed in claim 1, wherein the processor is configured to:
    group the plurality of pieces of sub-area distance information according to a predetermined precision condition and set the corrected distance information according to the plurality of pieces of sub-area distance information of a group with a largest quantity.

5. The projection device as claimed in claim 1, further comprising an image processing unit, wherein the image processing unit is coupled to the processor, and the processor is configured to:
    after determining the plurality of pieces of area distance information, select at least three pieces of first selected area distance information arranged along a first direction and at least three pieces of second selected area distance information arranged along a second direction,
    wherein the image processing unit uses the at least three pieces of first selected area distance information and the at least three pieces of second selected area distance information as corrected information of the projected image.

6. The projection device as claimed in claim 1, wherein in response to there being an obstacle around or in front of the target area, the projected image is located in the target area and does not cover the obstacle.

7. A projection method, suitable for a projection device, wherein the projection device comprises an optical engine, a distance measuring unit, and a processor and is suitable for projecting to a target area, and the projection method comprises:
    emitting a testing light to the target area by the distance measuring unit and receiving a reflected light formed by the reflection of the testing light, wherein the distance measuring unit generates a plurality of pieces of corresponding distance information according to the reflected light received and a plurality of predetermined areas of the target area;
    receiving the plurality of pieces of distance information from the distance measuring unit by the processor and generating a plurality of pieces of area distance information according to the plurality of pieces of distance information;
    performing determining on the plurality of pieces of area distance information in order to select a mode of a plurality of pieces of sub-area distance information by the processor from the plurality of pieces of sub-area distance information comprised in each of the plurality of pieces of area distance information as corrected distance information corresponding to each of the plurality of areas; and
    controlling the optical engine by the processor to project an image beam to form a projected image in the target area according to the corrected distance information of each of the plurality of areas.

8. The projection method as claimed in claim 7, further comprising:
    setting the distance measuring unit by the processor to define the target area to have the plurality of areas and divide each of the plurality of areas into a plurality of sub-areas; and grouping the plurality of pieces of distance information from the distance measuring unit into the plurality of pieces of area distance information by the processor, and each of the plurality of pieces of area distance information comprises the plurality of pieces of sub-area distance information.

9. The projection method as claimed in claim 8, further comprising:
selecting the plurality of pieces of distance information by the processor according to whether an energy intensity of the reflected light is greater than a predetermined threshold value.

10. The projection method as claimed in claim 7, further comprising:
grouping the plurality of pieces of sub-area distance information according to a predetermined precision condition by the processor and setting the corrected distance information according to the plurality of pieces sub-area distance information of a group with a largest quantity.

11. The projection method as claimed in claim 7, wherein the projection device further comprises an image processing unit, the image processing unit is coupled to the processor, and the projection method further comprises:
after determining the plurality of pieces of area distance information, selecting at least three pieces of first selected area distance information arranged along a first direction and at least three pieces of second selected area distance information arranged along a second direction by the processor; and
using the at least three pieces of first selected area distance information and the at least three pieces of second selected area distance information by the image processing unit as corrected information of the projected image.

12. The projection method as claimed in claim 7, wherein in response to there being an obstacle around or in front of the target area, controlling the optical engine by the processor to project the image beam so that the projected image is located in the target area and does not cover the obstacle.

* * * * *